United States Patent
Sakurai et al.

(10) Patent No.: US 12,283,715 B2
(45) Date of Patent: Apr. 22, 2025

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventors: Hiroshi Sakurai, Osaka (JP); Rika Kuratani, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 672 days.

(21) Appl. No.: 17/439,553

(22) PCT Filed: Feb. 14, 2020

(86) PCT No.: PCT/JP2020/005806
§ 371 (c)(1),
(2) Date: Sep. 15, 2021

(87) PCT Pub. No.: WO2020/189119
PCT Pub. Date: Sep. 24, 2020

(65) Prior Publication Data
US 2022/0190441 A1    Jun. 16, 2022

(30) Foreign Application Priority Data
Mar. 19, 2019 (JP) .................... 2019-050778

(51) Int. Cl.
| | |
|---|---|
| *H01M 50/449* | (2021.01) |
| *H01M 10/0525* | (2010.01) |
| *H01M 50/409* | (2021.01) |
| *H01M 50/426* | (2021.01) |
| *H01M 50/443* | (2021.01) |
| *H01M 50/446* | (2021.01) |
| *H01M 50/489* | (2021.01) |
| *H01M 50/491* | (2021.01) |

(52) U.S. Cl.
CPC ..... *H01M 50/449* (2021.01); *H01M 10/0525* (2013.01); *H01M 50/409* (2021.01); *H01M 50/426* (2021.01); *H01M 50/443* (2021.01); *H01M 50/446* (2021.01); *H01M 50/489* (2021.01); *H01M 50/491* (2021.01)

(58) Field of Classification Search
None
See application file for complete search history.

(56) References Cited

U.S. PATENT DOCUMENTS

| | | | | |
|---|---|---|---|---|
| 12,074,339 | B2 * | 8/2024 | Hamada | H01M 50/457 |
| 2016/0043370 | A1 | 2/2016 | Hatta et al. | |
| 2018/0233727 | A1 * | 8/2018 | Sakurai | H01M 50/426 |
| 2018/0254464 | A1 | 9/2018 | Sakurai et al. | |
| 2018/0331342 | A1 | 11/2018 | Honda et al. | |
| 2019/0044118 | A1 * | 2/2019 | Sakurai | H01M 4/13 |
| 2019/0106521 | A1 * | 4/2019 | Takamatsu | H01M 4/666 |
| 2021/0280945 | A1 * | 9/2021 | Kim | H01M 50/403 |
| 2021/0320381 | A1 * | 10/2021 | Molena | H01G 11/52 |
| 2022/0294080 | A1 * | 9/2022 | Zhang | C08L 23/06 |
| 2023/0126565 | A1 * | 4/2023 | Kai | H01M 50/403 |
| | | | | 429/144 |
| 2023/0198097 | A1 * | 6/2023 | Kai | C08L 33/08 |
| | | | | 429/144 |
| 2023/0282936 | A1 * | 9/2023 | Morimura | H01M 50/457 |
| | | | | 429/246 |

FOREIGN PATENT DOCUMENTS

| | | | |
|---|---|---|---|
| CN | 106415885 A | | 2/2017 |
| JP | 4127989 B2 | | 7/2008 |
| JP | 2011-110704 A | | 6/2011 |
| JP | 5429811 B2 | | 2/2014 |
| JP | 2014-160580 A | | 9/2014 |
| JP | 6171117 B1 | * | 7/2017 .......... H01M 10/052 |
| JP | 2018147656 A | * | 9/2018 ........... C08J 7/0427 |
| JP | 2018-163872 A | | 10/2018 |
| WO | 2014/148036 A1 | | 9/2014 |
| WO | 2015/190265 A1 | | 12/2015 |
| WO | 2017/065399 A1 | | 4/2017 |
| WO | WO-2017082260 A1 | * | 5/2017 |
| WO | 2017/195563 A1 | | 11/2017 |

OTHER PUBLICATIONS

Derwent Abstract and patent document of JP 6171117 B1 (Year: 2017).*
Abstract and patent document of JP 2018-147656 A (Year: 2018).*
Derwent Abstract and document of WO 2017-082260 A1 (Year: 2017).*
International Search Report for PCT/JP2020/005806 dated Apr. 21, 2020 [PCT/ISA/210].

\* cited by examiner

*Primary Examiner* — Kevin M Bernatz
(74) *Attorney, Agent, or Firm* — Sughrue Mion, PLLC

(57) ABSTRACT

Provided is a separator for a non-aqueous secondary battery containing a porous substrate; and an adhesive porous layer that is provided on one side or on both sides of the porous substrate, and that contains a polyvinylidene fluoride type resin, an acrylic type resin and metal sulfate particles, in which an average primary particle diameter of the metal sulfate particles contained in the adhesive porous layer is from 0.01 μm to less than 0.30 μm.

8 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2020/005806 filed Feb. 14, 2020, claiming priority based on Japanese Patent Application No. 2019-050778 filed Mar. 19, 2019.

TECHNICAL FIELD

The present invention relates to a separator for a non-aqueous secondary battery and a non-aqueous secondary battery.

BACKGROUND ART

A separator which is one of members constituting a non-aqueous secondary battery is required to have heat resistance that a film is not easily broken or shrunk even when the temperature inside the battery is high in order to ensure safety of the battery. As a separator having improved heat resistance, a separator is known in which a porous layer containing inorganic particles is provided on a porous substrate. For example, Patent Document 1 or 2 discloses a separator including a porous layer containing barium sulfate particles on a porous substrate.

In addition, the separator is required to have adhesiveness that does not easily peel off from the electrode even when the separator receives an impact from the outside or the electrode expands and contracts due to charging and discharging. As a separator having increased adhesiveness to an electrode, a separator is known in which a resin layer containing a resin exhibiting adhesiveness to an electrode is provided on a porous substrate. For example, Patent Document 3 discloses a separator including a porous layer containing a polyvinylidene fluoride type resin on a porous substrate.

PRIOR ART DOCUMENTS

Patent Documents

Patent Document 1: Japanese Patent No. 5429811
Patent Document 2: International Publication No. 2014/148036
Patent Document 3: Japanese Patent No. 4127989

SUMMARY OF INVENTION

Technical Problem

In manufacturing a battery, a laminate in which a separator is disposed between a positive electrode and a negative electrode may be subjected to dry heat pressing (hot pressing treatment performed without impregnating the separator with an electrolytic solution). When the separator and the electrode are favorably bonded by the dry heat press, the separator and the electrode are less likely to be misaligned in the manufacturing process of the battery, and the production yield of the battery can be improved. A separator that adheres well to an electrode by dry heat press and is excellent in heat resistance is preferable.

An embodiment of the present disclosure was achieved under the above described circumstances.

An object of an embodiment of the present disclosure is to provide a separator for a non-aqueous secondary battery, which is excellent in adhesion to an electrode by dry heat press and is hardly shrunk at a high temperature, and an object of the disclosure is to solve this problem.

Solution to Problem

The specific solutions to the problem include the following embodiments:

[1] A separator for a non-aqueous secondary battery, the separator containing:
a porous substrate; and
an adhesive porous layer that is provided on one side or on both sides of the porous substrate, and that contains a polyvinylidene fluoride type resin, an acrylic type resin and metal sulfate particles,
wherein an average primary particle diameter of the metal sulfate particles contained in the adhesive porous layer is from 0.01 μm to less than 0.30 μm.

[2] The separator for a non-aqueous secondary battery according to [1], wherein a ratio of the acrylic type resin with respect to a total amount of the polyvinylidene fluoride type resin and the acrylic type resin in the adhesive porous layer is from 2% by mass to 40% by mass.

[3] The separator for a non-aqueous secondary battery according to [1] or [2], wherein the acrylic type resin includes an acrylic type resin containing an acrylic type monomer unit, a styrene type monomer unit and an unsaturated carboxylic acid anhydride unit.

[4] The separator for a non-aqueous secondary battery according to any one of [1] to [3], wherein the acrylic type resin includes an acrylic type resin containing at least one of a methyl acrylate unit or a methyl methacrylate unit, and a total content of the methyl acrylate unit and the methyl methacrylate unit in the acrylic type resin is 20% by mass to 60% by mass.

[5] The separator for a non-aqueous secondary battery according to any one of [1] to [4], wherein the polyvinylidene fluoride type resin contains a hexafluoropropylene monomer unit, a content of the hexafluoropropylene monomer unit in the polyvinylidene fluoride type resin is 3% by mass to 20% by mass, and a weight-average molecular weight of the polyvinylidene fluoride type resin is from 100,000 to 1,500,000.

[6] A non-aqueous secondary battery that obtains electromotive force by lithium doping and dedoping, the non-aqueous secondary battery containing:
a positive electrode;
a negative electrode; and
the separator for a non-aqueous secondary battery according to any one of [1] to [5], the separator being disposed between the positive electrode and the negative electrode.

Advantageous Effects of Invention

According to the present disclosure, there is provided a separator for a non-aqueous secondary battery, which is excellent in adhesion to an electrode by dry heat press and hardly shrinks at a high temperature.

DESCRIPTION OF EMBODIMENTS

Hereinafter, the embodiments will be described. Further, the description and the Examples thereof illustrate the embodiments, but do not limit the scope of the embodiments.

In the present disclosure, the numerical range denoted by using "to" represents the range inclusive of the number written before and after "to" as the minimum and maximum values.

In the present disclosure, the term "process" includes not only an independent process, but also the process which is not clearly distinguished from other processes but achieves the desired purpose thereof.

In the present disclosure, when the amount of each component in a composition is referred to and when a plurality of substances corresponding to each component are present in the composition, the total amount of the plurality of components present in the composition is meant unless otherwise specified.

A plurality of kinds of particles corresponding to each component in the present disclosure may be contained. When there are a plurality of kinds of particles corresponding to each component in a composition, a particle diameter of each component means a value for a mixture of the plurality of kinds of particles present in the composition unless otherwise specified.

In the present disclosure, "MD direction" refers to the longitudinal direction of a porous substrate and a separator manufactured in a long shape, and "TD direction" refers to a direction orthogonal to "MD direction". "MD direction" also refers to "a machine direction", and "TD direction" also refers to "a transverse direction".

In the present disclosure, in a case where a lamination relationship among layers constituting a separator is expressed as "upper" and "lower", a layer closer to a substrate is referred to as "lower", and a layer farther from the substrate is referred to as "upper".

In the present disclosure, the notation "(meth)acryl" means either "acryl" or "methacryl".

In the present disclosure, "monomer unit" of a copolymer or a resin means a constituent unit of the copolymer or the resin, and means a constituent unit obtained by polymerizing a monomer.

In the present disclosure, performing the hot pressing treatment by impregnating the separator with the electrolytic solution is referred to as "wet heat press", and performing the hot pressing treatment without impregnating the separator with the electrolytic solution is referred to as "dry heat press".

<Separator for Non-Aqueous Secondary Battery>

A separator for a non-aqueous secondary battery (also simply referred to as "separator") of the present disclosure includes a porous substrate and an adhesive porous layer provided on one side or on both sides of the porous substrate.

In the separator of the present disclosure, the adhesive porous layer contains a polyvinylidene fluoride type resin, an acrylic type resin and metal sulfate particles, and an average primary particle diameter of the metal sulfate particles contained in the adhesive porous layer is from 0.01 μm to less than 0.30 μm.

In the disclosure, the acrylic type resin means a resin having an acrylic type monomer unit, and includes both a polymer obtained by polymerizing only an acrylic type monomer and a copolymer obtained by polymerizing an acrylic type monomer and another monomer.

The metal sulfate particles are less likely to decompose the electrolytic solution or the electrolyte than the metal hydroxide particles or the metal oxide particles, and thus are less likely to generate gas inside the battery. By using the metal sulfate particles as the inorganic filler of the adhesive porous layer, it is possible to obtain a separator which hardly generates gas in a battery and hardly causes swelling and deformation of the battery. In addition, since the metal sulfate particles are also excellent in heat resistance, they can contribute to improvement in heat resistance of the separator.

The polyvinylidene fluoride type resin is a resin suitable as a binder resin of the adhesive porous layer from the viewpoints of stability to an electrolytic solution, electrochemical stability, adhesiveness to an electrode, heat resistance, and the like. By using the polyvinylidene fluoride type resin as the binder resin of the adhesive porous layer, a separator suitable for a non-aqueous secondary battery can be obtained.

From the above viewpoint, the adhesive porous layer of the separator of the present disclosure contains a polyvinylidene fluoride type resin and metal sulfate particles, the adhesive porous layer of the separator of the present disclosure further contains an acrylic type resin, and the metal sulfate particles contained in the adhesive porous layer have an average primary particle diameter of from 0.01 μm to less than 0.30 μm. As a mechanism by which the separator having such a configuration is excellent in adhesion to an electrode by dry heat press and is less likely to shrink at a high temperature, the following is presumed.

First, the acrylic type resin has high affinity with the polyvinylidene fluoride type resin. Therefore, the polyvinylidene fluoride type resin and the acrylic type resin form a fibril shape in a state of being compatible with each other or in a state of being mixed with high uniformity, and form a three-dimensional network structure with high uniformity. It is presumed that the adhesive porous layer having a highly uniform three-dimensional network structure is excellent in adhesion to the electrode and the porous substrate.

Next, it is presumed that the acrylic type resin improves adhesion between the adhesive porous layer, the electrode, and the porous substrate because the acrylic type monomer unit has polarity.

Next, it is presumed that since the average primary particle diameter of the metal sulfate particles is less than 0.30 μm, there are few protrusions protruding from the surface of the adhesive porous layer, and the adhesive porous layer is excellent in adhesion to the electrode and the porous substrate.

Furthermore, since the average primary particle diameter of the metal sulfate particles is 0.01 μm or more, aggregation of the metal sulfate particles is suppressed, and uniformity of the surface property of the adhesive porous layer is high. It is presumed that the adhesive porous layer having high uniformity of surface properties is excellent in adhesion to the electrode and the porous substrate.

Then, it is presumed that the average primary particle diameter of the metal sulfate particles is less than 0.30 μm, that is, the particle diameter of the metal sulfate particles is relatively small, so the surface area (specific surface area) of the metal sulfate particles per unit volume is increased, and therefore the number of contact points between the metal sulfate particles and the binder resin is increased, and the shrinkage of the adhesive porous layer when exposed to a high temperature is suppressed. In addition, it is presumed that since a large number of metal sulfate particles having a small particle diameter are connected to each other, the adhesive porous layer is less likely to be broken when exposed to a high temperature.

On the other hand, when relatively small particles having an average primary particle diameter of from 0.01 μm to less than 0.30 μm are used as the metal sulfate particles, and the adhesive porous layer is formed only of the metal sulfate particles and the polyvinylidene fluoride type resin, the porous layer is densified, so the adhesion to the electrode by the dry heat press may be deteriorated. However, according to the embodiment of the present disclosure, it is presumed that by combining the polyvinylidene fluoride type resin and the acrylic type resin with the metal sulfate particles having a small particle diameter, the surface portion of the adhesive porous layer is easily deformed during dry heat press, and the adhesiveness with the electrode by the dry heat press is improved.

It is presumed that, due to the synergistic action described above, the separator of the present disclosure is excellent in adhesion to the electrode by dry heat press, and hardly shrinks at a high temperature.

Hereinafter, the details of the porous substrate and the adhesive porous layer included in the separator of the present disclosure will be described.

[Porous Substrate]

The porous substrate in the present disclosure refers to a substrate having pores or voids therein. As the substrate, a microporous film; a porous sheet such as non-woven fabric and paper, composed of a fibrous material; a composite porous sheet in which on a microporous film or a porous sheet, one or more of another porous layer are laminated; and the like may be listed. In the present disclosure, a microporous film is preferable from the viewpoint of thinning and strength of a separator. The microporous film refers to a film having a large number of micropores therein, having a structure in which these micropores are connected to each other, and allowing gas or liquid to pass from one side to the other side.

As the material for the porous substrate, materials having electrical insulation are preferably used and any of organic materials and inorganic materials may be used.

It is preferred that the porous substrate contains a thermoplastic resin, from the viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a battery may be mentioned, and among them, it is preferred to select those having sufficient mechanical properties and ion permeability.

It is preferred that the polyolefin microporous film contains polyethylene, from the viewpoint of exhibiting the shutdown function, and the content of polyethylene is preferably 95% by mass or more with respect to the total mass of the polyolefin microporous film.

It is preferred that the microporous film contains polypropylene, from the viewpoint of imparting heat resistance to the extent that the film is not easily broken when exposed to a high temperature.

It is preferred that the polyolefin microporous film contains polyethylene and polypropylene, from the viewpoint of imparting shutdown function and heat resistance that the film is not easily broken when exposed to a high temperature. As the polyolefin microporous film including polyethylene and polypropylene, a microporous film in which polyethylene and polypropylene are present in a mixed state in a layer may be mentioned. It is preferred that the microporous film contains 95% by mass or more of polyethylene and 5% by mass or less of polypropylene, from the viewpoint of compatibility of the shutdown function and heat resistance. In addition, from the viewpoint of compatibility of the shutdown function and heat resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight-average molecular weight (Mw) of from 100,000 to 5,000,000 is preferred. In the case that the polyolefin has a Mw of 100,000 or more, sufficient mechanical properties may be provided to the microporous film. Meanwhile, the polyolefin has a Mw of 5,000,000 or less, the shutdown characteristic of the microporous film is faborable, and film molding of the microporous film is easy.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; thermal resistant resins such as wholly aromatic polyamide, polyamideimide, polyimide, polyethersulfone, polysulfone, polyetherketone and polyetherimide; cellulose; and the like, or paper may be mentioned.

Examples of the composite porous sheet include a sheet in which a functional layer is stacked on a porous sheet made of a microporous film or a fibrous material. Such a composite porous sheet is preferable from the viewpoint that a function can be further added thereto with a functional layer. Examples of the functional layer include a porous layer made of a heat-resistant resin and a porous layer made of a heat-resistant resin and an inorganic filler from the viewpoint of imparting heat resistance. Examples of the heat-resistant resin include one or more heat-resistant resins selected from the group consisting of a wholly aromatic polyamide, a polyamideimide, a polyimide, a polyethersulfone, a polysulfone, a polyetherketone, and a polyetherimide. Examples of the inorganic filler include a metal oxide such as alumina, and a metal hydroxide such as magnesium hydroxide. Examples of a method of forming a composite include a method of applying a functional layer to a microporous film or a porous sheet, a method of bonding a microporous film or a porous sheet and a functional layer with an adhesive, and a method of thermally press-bonding a microporous film or a porous sheet with a functional layer.

The surface of the porous substrate may be subjected to various surface treatments within the range of not impairing the nature of the porous substrate, for the purpose of improving wettability with the coating liquid for forming the adhesive porous layer. As the surface treatment, corona treatment, plasma treatment, flame treatment, UV irradiation treatment, and the like may be mentioned.

[Characteristics of Porous Substrate]

The thickness of the porous substrate is preferably 25 μm or less, more preferably 20 μm or less, and still more preferably 15 μm or less, from the viewpoint of enhancing energy density of the battery, and is preferably 5 μm or more, more preferably 6 μm or more, and still more preferably 7 μm or more, from the viewpoint of production yield of the separator and production yield of the battery.

The Gurley value of the porous substrate (JIS P8117: 2009) is preferably from 50 sec/100 ml to 300 sec/100 ml from the viewpoint of ion permeability or suppression of battery short circuit.

The porous substrate preferably has a porosity of from 20% to 60% from the viewpoint of obtaining an appropriate film resistance and a shutdown function. The porosity ε (%) of the porous substrate is determined by the following formula.

$$\varepsilon = \{1 - Ws/(ds \cdot t)\} \times 100$$

Here, Ws: basis weight of porous substrate (g/m$^2$), ds: true density of porous substrate (g/cm$^3$), and t: thickness (μm) of porous substrate.

The puncture strength of the porous substrate is preferably 300 g or more from the viewpoint of production yield of the separator and production yield of the battery. The puncture strength of the porous substrate is measured by performing a puncture test under the condition of a curvature radius of a needle tip of 0.5 mm, and a puncture speed of 2 mm/sec, using a KES-G5 handy compression tester from KATO TECH CO., LTD., to obtain a maximum puncture load (g).

[Adhesive Porous Layer]

In the separator of the present disclosure, the adhesive porous layer is a layer that is provided on one side or both sides of the porous substrate as an outermost layer of the separator, and may be adhered to the electrode when superimposing the separator and the electrode, and performing press or thermal press. The adhesive porous layer has a large number of fine pores therein, has a structure in which these fine pores are connected with each other, and allows gas or liquid to pass from one surface to the other surface.

In the separator of the present disclosure, the adhesive porous layer may be provided on only one side of the porous substrate or on both sides of the porous substrate. When the adhesive porous layer is present on both sides of the porous substrate, the adhesion of the separator to both electrodes of the battery is faborable. In addition, curling is less likely to occur in the separator, and the handleability during the manufacturing of the battery is excellent. When the adhesive porous layer is present only on one side of the porous substrate, ion permeability of the separator is more excellent. In addition, the thickness of the entire separator can be suppressed, and a battery having a higher energy density can be manufactured.

In the separator of the present disclosure, the adhesive porous layer contains at least a polyvinylidene fluoride type resin, an acrylic type resin, and metal sulfate particles. In the separator of the present disclosure, the adhesive porous layer may contain a resin other than the polyvinylidene fluoride type resin and the acrylic type resin, an inorganic filler of metal sulfate particles, an organic filler, and the like.

In the separator of the present disclosure, the adhesive porous layer is preferably in a state in which the polyvinylidene fluoride type resin and the acrylic type resin are compatible with each other or are uniformly mixed with each other. In the separator of the present disclosure, the adhesive porous layer becomes a fibril shape in a state in which a resin in which the polyvinylidene fluoride type resin and the acrylic type resin are compatible with each other or a uniformly mixed resin contains metal sulfate particles, and thus preferably forms a three-dimensional network structure. The structure which becomes the fibril shape in the state in which the resin contains the inorganic particles and thus forms the three-dimensional network structure can be confirmed by, for example, a scanning electron microscope (Scanning Electron Microscope, SEM) or the like.

—Polyvinylidene Fluoride Type Resin—

Examples of the polyvinylidene fluoride type resin include homopolymers of vinylidene fluoride (i.e. polyvinylidene fluoride); copolymers of vinylidene fluoride and other copolymerizable monomer (polyvinylidene fluoride copolymers); and mixtures thereof. Examples of the monomer polymerizable with vinylidene fluoride include tetrafluoroethylene, hexafluoropropylene, trifluoroethylene, chlorotrifluoroethylene, vinyl fluoride, and trichloroethylene, and one or two thereof can be used.

The polyvinylidene fluoride type resin is preferably a vinylidene fluoride (VDF) and hexafluoropropylene (HFP) copolymer (VDF-HFP copolymer) from the viewpoint of the adhesiveness to the electrode. In the present disclosure, the VDF-HFP copolymer includes both a copolymer obtained by polymerizing only the VDF and HFP and a copolymer obtained by polymerizing the VDF, the HFP, and another monomer. The VDF-HFP copolymer can control crystallinity, heat resistance, solubility resistance to an electrolytic solution, and the like of the copolymer within appropriate ranges by increasing or decreasing the content of the HFP unit.

As the VDF-HFP copolymer contained in the adhesive porous layer in the separator of the present disclosure, a copolymer having 3% by mass to 20% by mass of HFP unit content with respect to the total monomer units and a weight-average molecular weight (Mw) of from 100,000 to 1,500,000 is preferable for the following reasons.

When the HFP unit content of the VDF-HFP copolymer is 3% by mass or more, the mobility of a polymer chain when dry heat press is performed is high, and the polymer chain enters irregularities of an electrode surface to exhibit an anchor effect, so that adhesiveness of the adhesive porous layer to the electrode can be improved. From this viewpoint, the HFP unit content of the VDF-HFP copolymer is preferably 3% by mass or more, more preferably 5% by mass or more, still more preferably 6% by mass or more.

When the HFP unit content of the VDF-HFP copolymer is 20% by mass or less, the copolymer is hardly dissolved and is not excessively swollen in the electrolytic solution, and therefore adhesiveness of the electrode and the adhesive porous layer can be maintained in the battery. From this viewpoint, the HFP unit content of the VDF-HFP copolymer is preferably 20% by mass or less, more preferably 18% by mass or less, still more preferably 15% by mass or less.

When the weight-average molecular weight (Mw) of the VDF-HFP copolymer is 100,000 or more, the mechanical strength of the adhesive porous layer is improved, leading to improvement of adhesiveness to the electrode. In addition, when the weight-average molecular weight (Mw) of the VDF-HFP copolymer is 100,000 or more, the copolymer is hardly dissolved in the electrolytic solution, and therefore adhesiveness of the electrode and the adhesive porous layer can be maintained in the battery. From these viewpoints, the weight-average molecular weight (Mw) of the VDF-HFP copolymer is preferably 100,000 or more, more preferably 200,000 or more, still more preferably 300,000 or more, still more preferably 500,000 or more.

When the weight-average molecular weight (Mw) of the VDF-HFP copolymer is 1,500,000 or less, the viscosity of a coating liquid used for forming of the adhesive porous layer is not excessively high, favorable moldability and crystal formation are secured, and uniformity of surface properties of the adhesive porous layer is high, resulting in favorable adhesiveness of the adhesive porous layer to the electrode. In addition, when the weight-average molecular weight (Mw) of the VDF-HFP copolymer is 1,500,000 or less, the mobility of a polymer chain when dry heat press is performed is high, and the polymer chain enters irregularities of an electrode surface to exhibit an anchor effect, so that adhesiveness of the adhesive porous layer to the electrode can be improved. From these viewpoints, the weight-average molecular weight (Mw) of the VDF-HFP copolymer is preferably 1,500,000 or less, more preferably 1,200,000 or less, still more preferably 1,000,000 or less.

The VDF-HFP copolymer having a content in 3% by mass to 20% by mass of HFP unit with respect to all monomer units and a weight-average molecular weight of from 100,000 to 1,500,000 is also preferable from the viewpoint of high affinity with the acrylic type resin.

Since the polyvinylidene fluoride type resin contains the electrolytic solution and moderately swells, when wet heat press is performed, the adhesiveness of the adhesive porous layer to the electrode is improved. Among them, the VDF-HFP copolymer in which the content of the HFP unit is from 3% by mass to 20% by mass with respect to all the monomer units and the weight-average molecular weight is from 100,000 to 1,500,000 further improves the adhesiveness of the adhesive porous layer to the electrode when the wet heat press is performed.

—Acrylic Type Resin—

In the present disclosure, the acrylic type resin means a resin having an acrylic type monomer unit, and includes both a polymer obtained by polymerizing only an acrylic type monomer and a copolymer obtained by polymerizing an acrylic type monomer and another monomer.

The acrylic type monomer is preferably at least one acrylic type monomer selected from the group consisting of (meth)acrylic acid, (meth)acrylic acid salt, and (meth)acrylic acid ester.

Examples of the (meth)acrylic acid salt include sodium (meth)acrylate, potassium (meth)acrylate, magnesium (meth)acrylate, zinc (meth)acrylate, and the like.

Examples of the (meth)acrylic acid ester include methyl (meth)acrylate, ethyl (meth)acrylate, isopropyl (meth)acrylate, n-butyl (meth)acrylate, isobutyl (meth) methacrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, 4-hydroxybutyl (meth)acrylate, 2-(diethylamino) ethyl (meth)acrylate, and methoxypolyethylene glycol (meth)acrylate.

As the acrylic type monomer, methyl (meth)acrylate, ethyl (meth)acrylate, isopropyl (meth)acrylate, n-butyl (meth)acrylate, lauryl (meth)acrylate, stearyl (meth)acrylate, 2-ethylhexyl (meth)acrylate, and 2-hydroxyethyl (meth)acrylate are preferable.

As the acrylic type resin, from the viewpoint of high compatibility with polyvinylidene fluoride type resin, an acrylic type resin containing a monomer unit derived from a lower alkyl ester of (meth)acrylic acid (alkyl group having 1 to 6 carbon atoms, preferably alkyl group having 1 to 4 carbon atoms) is preferable, an acrylic type resin containing at least one of a methyl acrylate unit or a methyl methacrylate unit is more preferable, and an acrylic type resin containing methyl methacrylate units are still more preferable. An acrylic type resin containing at least one of a methyl acrylate unit or a methyl methacrylate unit is preferable because it has an effect of lowering the glass transition temperature of the adhesive porous layer.

The content of the acrylic type monomer unit contained in the acrylic type resin is preferably 20% by mass to 70% by mass, more preferably 25% by mass to 65% by mass, and still more preferably 30% by mass to 60% by mass with respect to the total monomer units.

The content of the methyl acrylate unit and the methyl methacrylate unit contained in the acrylic type resin is preferably 20% by mass to 60% by mass, more preferably 25% by mass to 55% by mass, and still more preferably 30% by mass to 50% by mass with respect to the total monomer units.

The content of the methyl methacrylate unit contained in the acrylic type resin is preferably 20% by mass to 60% by mass, more preferably 25% by mass to 55% by mass, and still more preferably 30% by mass to 50% by mass with respect to the total monomer units.

The acrylic type resin preferably has a styrene monomer unit, that is, the acrylic type resin is preferably a styrene acrylic type resin. Since the styrene-acrylic type resin has a styrene-based monomer unit, and thus, is difficult to dissolve or swell in the electrolytic solution, compared to the adhesive porous layer that uses only polyvinylidene fluoride type resin as the binder resin, in the adhesive porous layer using polyvinylidene fluoride type resin and styrene acrylic type resin as binder resin, it is presumed that the adhesion between the adhesive porous layer and the electrode and the porous substrate is maintained inside the battery (that is, in the state in which the electrolytic solution is impregnated).

Examples of the styrene-based monomer include styrene, meta-chlorostyrene, para-chlorostyrene, para-fluorostyrene, para-methoxystyrene, meta-tert-butoxystyrene, para-tert-butoxystyrene, para-vinylbenzoic acid, para-methyl-α-methylstyrene, and the like.

As the styrene-based monomer, styrene, para-methoxystyrene, and para-methyl-α-methylstyrene are preferable, and styrene is particularly preferable from the viewpoint of suppressing the dissolution of the acrylic type resin in the electrolytic solution.

The content of the styrene-based monomer unit contained in the acrylic type resin is preferably 25% by mass to 75% by mass, more preferably 30% by mass to 70% by mass, and still more preferably 35% by mass to 65% by mass with respect to the total monomer units.

The content of the styrene unit contained in the acrylic type resin is preferably 25% by mass to 75% by mass, more preferably 30% by mass to 70% by mass, and still more preferably 35% by mass to 65% by mass with respect to the total monomer units.

An example of the acrylic type resin is a copolymer containing an acrylic type monomer unit and a monomer unit derived from an unsaturated carboxylic acid anhydride.

Another form of the acrylic type resin includes a copolymer containing an acrylic type monomer unit, a styrene monomer unit, and a monomer unit derived from an unsaturated carboxylic acid anhydride.

Examples of the unsaturated carboxylic acid anhydride as a monomer constituting the acrylic type resin include maleic anhydride, itaconic anhydride, citraconic anhydride, 4-methacryloxyethyl trimellitic anhydride, trimellitic anhydride, and the like. It is presumed that when the acrylic type resin contains an unsaturated carboxylic acid anhydride unit, the strength of polarization of the unsaturated carboxylic acid anhydride unit generates intermolecular interaction with the constituent components of the electrode, or the residual carboxy group derived from the unsaturated carboxylic acid anhydride reacts with the amino terminal of the resin component in the electrode, thereby improving the adhesiveness between the adhesive porous layer and the electrode.

When the acrylic type resin contains an unsaturated carboxylic acid anhydride unit, the content of the unsaturated carboxylic acid anhydride unit is preferably 1% by mass or more, more preferably 5% by mass or more, and still more preferably 10% by mass or more with respect to all monomer units from the viewpoint of improving the adhesiveness between the adhesive porous layer and the electrode.

When the acrylic type resin contains an unsaturated carboxylic acid anhydride unit, the content of the unsaturated carboxylic acid anhydride unit is preferably 50% by mass or less, more preferably 40% by mass or less, and still more preferably 30% by mass or less with respect to all monomer units from the viewpoint of suppressing the glass transition temperature of the acrylic type resin to 150° C. or lower and enabling the adhesion to the electrode by the dry heat press.

The glass transition temperature (Tg) of the acrylic type resin is preferably in the range of from −20° C. to 150° C. As the Tg of the acrylic type resin is lower, the fluidity of the acrylic type resin is enhanced by the dry heat press, so the polymer chain penetrates into the unevenness of the electrode surface to exert an anchor effect and improve the adhesion of the adhesive porous layer to the electrode. From the present viewpoint, the Tg of the acrylic type resin is preferably 150° C. or lower, more preferably 120° C. or lower, and still more preferably 100° C. or lower. When the Tg of the acrylic type resin is −20° C. or higher, the adhesive porous layer hardly causes blocking.

The Tg of the acrylic type resin can be controlled by changing the copolymerization ratio of the acrylic type monomer, the styrene monomer, the unsaturated carboxylic acid anhydride, and the like using a FOX formula as a guideline.

The weight-average molecular weight (Mw) of the acrylic type resin is preferably 10,000 to 500,000. When the Mw of the acrylic type resin is 10,000 or more, the adhesive strength with the electrode is further improved. When the Mw of the acrylic type resin is 500,000 or less, the fluidity of the adhesive porous layer tends to increase during the dry heat press. The Mw of the acrylic type resin is more preferably from 30,000 to 300,000, and still more preferably from 50,000 to 200,000.

The content of the polyvinylidene fluoride type resin and the acrylic type resin contained in the adhesive porous layer is preferably 85% by mass or more, more preferably 90% by mass or more, still more preferably 95% by mass or more, and even still more preferably 100% by mass with respect to the total amount of all resins contained in the adhesive porous layer.

The content of the polyvinylidene fluoride type resin contained in the adhesive porous layer is preferably 60% by mass to 98% by mass, more preferably 62% by mass to 93% by mass, still more preferably 65% by mass to 90% by mass, and even still more preferably 70% by mass to 85% by mass with respect to the total amount of all resins contained in the adhesive porous layer.

The content of the acrylic type resin contained in the adhesive porous layer is preferably 2% by mass or more, more preferably 7% by mass or more, still more preferably 10% by mass or more, and even still more preferably 15% by mass or more with respect to the total amount of all resins contained in the adhesive porous layer. Within this range, the adhesion to the electrode by the dry heat press is more excellent, and the peel strength between the porous substrate and the adhesive porous layer is increased. The content of the acrylic type resin contained in the adhesive porous layer is preferably 40% by mass or less, more preferably 38% by mass or less, still more preferably 35% by mass or less, and even still more preferably 30% by mass or less with respect to the total amount of all resins contained in the adhesive porous layer. Within this range, the cohesive fracture of the adhesive porous layer is suppressed.

The ratio of the acrylic type resin with respect to the total amount of the polyvinylidene fluoride type resin and the acrylic type resin contained in the adhesive porous layer is preferably 2% by mass or more, more preferably 7% by mass or more, still more preferably 10% by mass or more, and still more preferably 15% by mass or more. Within this range, the adhesion to the electrode by the dry heat press is more excellent, and the peel strength between the porous substrate and the adhesive porous layer is increased. The ratio of the acrylic type resin with respect to the total amount of the polyvinylidene fluoride type resin and the acrylic type resin contained in the adhesive porous layer is preferably 40% by mass or less, more preferably 38% by mass or less, still more preferably 35% by mass or less, and still more preferably 30% by mass or less. Within this range, the cohesive fracture of the adhesive porous layer is suppressed.

Examples of the method of preparing a polyvinylidene fluoride type resin include an emulsion polymerization method and a suspension polymerization method. In addition, it is also possible to use a commercially available polyvinylidene fluoride type resin.

—Other Resins—

The adhesive porous layer may contain other resins other than the polyvinylidene fluoride type resin and the acrylic type resin.

Examples of other resins include fluorine-based rubber, styrene-butadiene copolymers, homopolymers or copolymers of vinylnitrile compounds (acrylonitrile, methacrylonitrile and the like), carboxymethyl cellulose, hydroxyalkyl cellulose, polyvinyl alcohol, polyvinyl butyral, polyvinyl pyrrolidone, and polyethers (polyethylene oxide, polypropylene oxide and the like).

The content of other resins other than the polyvinylidene fluoride type resin and the acrylic type resin contained in the adhesive porous layer is preferably 15% by mass or less, more preferably 10% by mass or less, still more preferably 5% by mass or less, and still more preferably 0% by mass with respect to the total amount of all resins contained in the adhesive porous layer.

—Metal Sulfate Particles—

The separator of the present disclosure contains metal sulfate particles in the adhesive porous layer. The average primary particle diameter of the metal sulfate particles contained in the adhesive porous layer is from 0.01 μm to less than 0.30 μm.

The average primary particle diameter of the metal sulfate particles contained in the adhesive porous layer is less than 0.30 μm, more preferably 0.28 μm or less, and still more preferably 0.25 μm or less from the viewpoint of suppressing shrinkage of the adhesive porous layer when exposed to a high temperature.

The average primary particle diameter of the metal sulfate particles contained in the adhesive porous layer is 0.01 μm or more, more preferably 0.03 μm or more, and still more preferably 0.05 μm or more from the viewpoint of suppressing the aggregation of the metal sulfate particles and forming the adhesive porous layer having high uniformity.

The average primary particle diameter of the metal sulfate particles can be determined by measuring the major diameters of 100 metal sulfate particles randomly selected in observation with a scanning electron microscope (SEM), and averaging the major diameters of the 100 metal sulfate particles. When the primary particle diameter of the metal sulfate particles is small and it is difficult to measure the major axis of the metal sulfate particles, and/or when the aggregation of the metal sulfate particles is remarkable and the major axis of the metal sulfate particles cannot be measured, the BET specific surface area (m$^2$/g) of the metal sulfate particles is measured, and the average primary particle diameter may be determined according to the following formula assuming that the metal sulfate particles are spherical.

Average primary particle diameter (μm)=6÷[specific gravity (g/cm$^3$)×BET specific surface area (m$^2$/g)]

The BET specific surface area (m$^2$/g) is determined by a BET multipoint method in a gas adsorption method using nitrogen gas. In the measurement by the gas adsorption method, the nitrogen gas is adsorbed on the metal sulfate particles at a boiling point temperature (−196° C.) of liquid nitrogen.

The sample to be subjected to the SEM observation is metal sulfate particles as a material of the adhesive porous layer or the metal sulfate particles taken out from the separator. The method of taking out the metal sulfate particles from the separator is not limited, and examples thereof include a method in which the separator is heated to about 800° C. to remove the binder resin and take out the metal sulfate particles, and a method in which the separator is immersed in an organic solvent to dissolve the binder resin with the organic solvent and take out the metal sulfate particles.

The particle shape of the metal sulfate particles is not limited, and may be any of a spherical shape, an elliptical shape, a plate shape, a needle shape, and an amorphous shape. The metal sulfate particles contained in the adhesive porous layer are preferably plate-shaped particles or primary particles that are not aggregated from the viewpoint of suppressing short circuit of the battery.

The volume ratio of the metal sulfate particles in the adhesive porous layer is preferably 40% by volume or more, more preferably 45% by volume or more, and still more preferably 50% by volume or more from the viewpoint of heat resistance of the separator. The volume ratio of the metal sulfate particles in the adhesive porous layer is preferably 90% by volume or less, more preferably 85% by volume or less, and still more preferably 80% by volume or less from the viewpoint that the adhesive porous layer is hardly peeled off from the porous substrate.

Examples of the metal sulfate particles include particles of barium sulfate (BaSO$_4$), particles of strontium sulfate (SrSO$_4$), particles of calcium sulfate (CaSO$_4$), particles of calcium sulfate dihydrate (CaSO$_4$.2H$_2$O), particles of alunite (KAl$_3$(SO$_4$)$_2$(OH)$_6$), and particles of jalosite (KFe$_3$(SO$_4$)$_2$(OH)$_6$). Among them, particles of barium sulfate (BaSO$_4$) are most preferable. The metal sulfate particles may be used singly or in combination of two or more kinds thereof.

—Other Particles—

In the separator of the present disclosure, the adhesive porous layer may contain other inorganic particles other than metal sulfate particles. However, the volume ratio of the other inorganic particles in the adhesive porous layer is preferably 15% by volume or less, more preferably 10% by volume or less, and still more preferably 5% by volume or less from the viewpoint of suppressing gas generation in the battery.

Examples of the other inorganic particles include particles of metal hydroxides such as magnesium hydroxide, aluminum hydroxide, calcium hydroxide, chromium hydroxide, zirconium hydride, cerium hydroxide, nickel hydroxide, and boron hydroxide; particles of metal oxides such as magnesium oxide, alumina, boehmite (alumina monohydrate), titania, silica, zirconia, barium titanate, and zinc oxide; particles of metal carbonates such as magnesium carbonate and calcium carbonate; particles of metal nitrides such as magnesium nitride, aluminum nitride, calcium nitride, and titanium nitride; metal fluorides such as magnesium fluoride and calcium fluoride; clay minerals such as calcium silicate, calcium phosphate, apatite, and talc, and the like. The other inorganic particles are preferably metal hydroxide particles or metal oxide particles from the viewpoint of stability to an electrolytic solution and electrochemical stability. The other inorganic particles may be surface-modified with a silane coupling agent or the like.

The particle shape of each of the other inorganic particles is not limited, and may be a spherical shape, an elliptical shape, a plate shape, a needle shape, or an amorphous shape. The other inorganic particles contained in the adhesive porous layer are preferably plate-shaped particles or non-aggregated primary particles from the viewpoint of suppressing short circuit of a battery.

The other inorganic particles may be used singly or in combination of two or more kinds thereof.

The other inorganic particles preferably have an average primary particle diameter of from 0.01 μm to 5 μm. A lower limit thereof is more preferably 0.1 μm or more, and an upper limit thereof is more preferably 1 μm or less.

In the separator of the present disclosure, the adhesive porous layer may contain an organic filler. Examples of the organic filler include particles of a crosslinked polymer such as crosslinked poly (meth)acrylic acid, crosslinked poly (meth)acrylate, crosslinked polysilicone, crosslinked polystyrene, crosslinked polydivinylbenzene, a styrene-divinylbenzene copolymer crosslinked product, a melamine resin, a phenol resin, or a benzoguanamine-formaldehyde condensate; and particles of a heat-resistant polymer such as polysulfone, polyacrylonitrile, aramid, or polyacetal. These organic fillers may be used singly or in combination of two or more kinds thereof.

—Other Components—

In the separator of the present disclosure, the adhesive porous layer may contain an additive, for example, a dispersant such as a surfactant, a wetting agent, an antifoaming agent, or a pH adjuster. The dispersant is added to a coating liquid for forming an adhesive porous layer for the purpose of improving dispersibility, coatability, or storage stability. The wetting agent, the antifoaming agent, or the pH adjuster is added to a coating liquid for forming an adhesive porous layer for the purpose of, for example, improving compatibility with the porous substrate, suppressing mixing of air into the coating liquid, or adjusting the pH.

[Characteristics of Adhesive Porous Layer]

The thickness of the adhesive porous layer is preferably 0.5 μm or more per one side, and more preferably 1.0 μm or more per one side from the viewpoint of adhesiveness to an electrode, and is preferably 8.0 µm or less per one side, and more preferably 6.0 µm or less per one side from the viewpoint of energy density of a battery.

When the adhesive porous layer is provided on both sides of the porous substrate, the total thickness of both sides of the adhesive porous layer is preferably 1.0 µm or more and more preferably 2.0 µm or more, and preferably 10.0 µm or less and more preferably 8.0 µm or less.

When the adhesive porous layer is provided on both sides of the porous substrate, the difference between the thickness of the adhesive porous layer on one side and the thickness of the adhesive porous layer on the other side is preferably 20% or less of the total thickness of both sides, and the lower the difference, the more preferable.

The mass of the adhesive porous layer per unit area is preferably 1.0 g/m² or more per one side and more preferably 2.0 g/m² or more per one side from the viewpoint of adhesiveness to an electrode, and is preferably 8.0 g/m² or less per one side and more preferably 7.0 g/m² or less per one side from the viewpoint of the ion permeability.

When the adhesive porous layers are provided on both sides of the porous substrate, a difference in the mass of the adhesive porous layer between one side and the other side is preferably 20% by mass or less with respect to the total mass on both sides from the viewpoint of suppressing curling of the separator.

The porosity of the adhesive porous layer is preferably 30% or more from the viewpoint of ion permeability, and is preferably 80% or less, more preferably 70% or less, still more preferably 60% or less from the viewpoint of mechanical strength of the adhesive porous layer. The porosity ε (%) of the adhesive porous layer is determined by the following formula.

$$\varepsilon = \{1-(Wa/da+Wb/db+Wc/dc+ \ldots +Wn/dn)/t\} \times 100$$

Here, the constituent materials of the adhesive porous layer are represented by a, b, c, . . . , n, the mass of each constituent material is represented by Wa, Wb, Wc, . . . , or Wn (g/cm²), the true density of each constituent material is represented by da, db, dc, . . . , or dn (g/cm³), and the thickness of the adhesive porous layer is represented by t (cm).

The average pore size of the adhesive porous layer is preferably 10 nm or more from the viewpoint of ion permeability and is preferably 200 nm or less from the viewpoint of adhesiveness to an electrode.

The average pore size (nm) of the adhesive porous layer is calculated by the following formula, assuming that all pores are cylindrical.

$$d = 4 \, V/S$$

In the formula, d represents an average pore size (diameter) of the adhesive porous layer, V represents a pore volume per square meter of the adhesive porous layer, and S represents a pore surface area per square meter of the adhesive porous layer.

The pore volume V per square meter of the adhesive porous layer is calculated from the porosity of the heat-resistant porous layer.

The pore surface area S per square meter of the adhesive porous layer is determined by the following method.

First, a specific surface area (m²/g) of the porous substrate and a specific surface area (m²/g) of the separator are calculated from a nitrogen gas adsorption amount by applying a BET formula to a nitrogen gas adsorption method. These specific surface areas (m²/g) are multiplied by basis weights (g/m²) of the porous substrate and the separator, respectively, to calculate a pore surface area per square meter. Then, the pore surface area per square meter of the porous substrate is subtracted from the pore surface area per square meter of the separator to calculate the pore surface area S per square meter of the adhesive porous layer.

The peel strength between the porous substrate and the adhesive porous layer is preferably 0.20 N/10 mm or more, more preferably 0.25 N/10 mm or more, still more preferably 0.30 N/10 mm or more, and a higher peel strength between the porous substrate and the adhesive porous layer is more preferable, from the viewpoint of the handleability of the separator. The upper limit of the peel strength is not particularly limited, and it is usually 2.0 N/10 mm or less. In a case where the separator of the present disclosure has adhesive porous layers on both sides of the porous substrate, the peel strength between the porous substrate and each of the adhesive porous layers is preferably in the above range on both sides of the porous substrate.

[Characteristics of Separator]

The thickness of the separator of the present disclosure is preferably 5 µm or more, and more preferably 10 µm or more from the viewpoint of the mechanical strength of the separator, and is preferably 35 µm or less, and more preferably 25 µm or less from the viewpoint of the energy density of a battery.

The puncture strength of the separator of the present disclosure is preferably from 250 g to 1000 g, and more preferably from 300 g to 600 g from the viewpoint of the mechanical strength of the separator or the short-circuit resistance of a battery. A method of measuring the puncture strength of the separator is similar to a method of measuring the puncture strength of the porous substrate.

The porosity of the separator of the present disclosure is preferably from 30% to 65%, and more preferably from 30% to 60%, from the viewpoint of adhesiveness to an electrode, the handleability of the separator, the ion permeability thereof, or the mechanical strength thereof.

The Gurley value (JIS P8117: 2009) of the separator of the present disclosure is preferably from 100 seconds/100 mL to 300 seconds/100 mL from the viewpoint of mechanical strength and load characteristics of a battery.

The separator of the present disclosure has a shrinkage ratio, when heat-treated at 135° C. for 1 hour, in an MD direction of preferably 30% or less, more preferably 20% or less, still more preferably 15% or less, still more preferably 10% or less, and particularly preferably 0%.

The separator of the present disclosure has a shrinkage ratio, when heat-treated at 135° C. for 1 hour, in a TD direction of preferably 30% or less, more preferably 20% or less, still more preferably 15% or less, still more preferably 10% or less, and particularly preferably 0%.

The separator of the present disclosure has an area shrinkage ratio, when heat-treated at 135° C. for 1 hour, of preferably 30% or less, more preferably 20% or less, still more preferably 15% or less, still more preferably 10% or less, and particularly preferably 0%.

The separator of the present disclosure has a shrinkage ratio, when heat-treated at 150° C. for 1 hour, in an MD direction of preferably 70% or less, more preferably 55% or less, still more preferably 45% or less, still more preferably 20% or less, and still more preferably 10% or less.

The separator of the present disclosure has a shrinkage ratio, when heat-treated at 150° C. for 1 hour, in a TD direction of preferably 70% or less, more preferably 55% or less, still more preferably 45% or less, still more preferably 20% or less, and still more preferably 10% or less.

The separator of the present disclosure has an area shrinkage ratio, when heat-treated at 150° C. for 1 hour, of preferably 70% or less, more preferably 55% or less, still more preferably 45% or less, still more preferably 20% or less, and still more preferably 10% or less.

The area shrinkage ratio when the separator is heated at 135° C. or 150° C. for one hour is determined by the following measuring method.

The separator is cut out into a rectangle of 180 mm in an MD direction×60 mm in a TD direction to prepare a test piece. This test piece is marked at points of 20 mm and 170 mm from one end on a line bisecting the test piece in a TD direction (referred to as points A and B, respectively). Furthermore, the test piece is marked at points of 10 mm and 50 mm from one end on a line bisecting the test piece in an MD direction (referred to as points C and D, respectively). A clip is attached to the marked test piece (a point where the clip is attached is between the point A and an end closest to the point A). The test piece is hung in an oven in which the temperature is adjusted to 135° C. or 150° C. to be heated under no tension for one hour. A length between A and B and a length between C and D are measured before and after the heat treatment, and an area shrinkage ratio is calculated by the following formula.

Area shrinkage ratio (%)={1−(length between $A$ and $B$ after heat treatment÷length between $A$ and $B$ before heat treatment)×(length between $C$ and $D$ after heat treatment÷length between $C$ and $D$ before heat treatment)}×100

The shrinkage ratio of the separator of the present disclosure at the time of the heat treatment can be controlled by, for example, the content of inorganic particles in the adhesive porous layer, the thickness of the adhesive porous layer, or the porosity of the adhesive porous layer.

The separator of the present disclosure may further include other layers other than the porous substrate and the adhesive porous layer. Examples of the other layer include a heat-resistant layer mainly for the purpose of improving heat resistant property of the separator.

[Method of Producing Separator]

The separator of the present disclosure can be produced, for example, by forming the adhesive porous layer on the porous substrate by a wet coating method or a dry coating method. In the present disclosure, the wet coating method is a method of solidifying a coating layer in a coagulation liquid, and the dry coating method is a method of drying a coating layer to solidify the coating layer.

Hereinafter, embodiment examples of the wet coating method will be described. In the following description, the polyvinylidene fluoride type resin and the acrylic type resin will be collectively referred to as binder resins.

The wet coating method is a method of applying a coating liquid containing a binder resin and metal sulfate particles onto a porous substrate, immersing the resulting product in a coagulation liquid to solidify the coating layer, pulling the resulting product out of the coagulation liquid, washing the resulting product with water, and drying the resulting product.

The coating liquid for forming the adhesive porous layer is prepared by dissolving or dispersing a binder resin and metal sulfate particles in a solvent. In the coating liquid, a component other than the binder resin and the metal sulfate particles is dissolved or dispersed, if necessary.

A solvent used for preparing the coating liquid includes a solvent that dissolves the binder resin (hereinafter, also referred to as "good solvent"). Examples of the good solvent include a polar amide solvent such as N-methylpyrrolidone, dimethylacetamide, or dimethylformamide.

The solvent used for preparing the coating liquid preferably contains a phase separation agent that induces phase separation from the viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 60% by mass or more of the good solvent and 5% by mass to 40% by mass of the phase separation agent from the viewpoint of forming a favorable porous structure.

The binder resin concentration of the coating liquid is preferably from 1% by mass to 20% by mass from the viewpoint of forming a favorable porous structure. The inorganic particle concentration of the coating liquid is preferably from 2% by mass to 50% by mass from the viewpoint of forming a favorable porous structure.

The coating liquid may contain a dispersant such as a surfactant, a wetting agent, an antifoaming agent, or a pH adjuster. These additives may be those remain in the adhesive porous layer as long as the additives are electrochemically stable in the range of use of a non-aqueous secondary battery and do not inhibit the reaction in the battery.

Examples of a means of applying the coating liquid to the porous substrate include a Meyer bar, a die coater, a reverse roll coater, a roll coater, and a gravure coater. In a case where the adhesive porous layers are formed on both sides of the porous substrate, it is preferable to simultaneously apply the coating liquid to both sides of the porous substrate from the viewpoint of productivity.

The coating layer is solidified by immersing the porous substrate on which the coating layer is formed in a coagulation liquid, and solidifying the binder resin while phase separation is induced in the coating layer. As a result, a laminated body composed of the porous substrate and the adhesive porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

After the coating layer is solidified in the coagulation liquid, the laminated body is pulled out of the coagulation liquid and washed with water. By washing the laminated body with water, the coagulation liquid is removed from the laminated body. Furthermore, by drying the laminated body, water is removed from the laminated body. Washing with water is performed, for example, by transporting the laminated body in a water washing bath. Drying is performed, for example, by transporting the laminated body in a high-temperature environment, blowing air to the laminated body, or bringing the laminated body into contact with a heat roll. The drying temperature is preferably from 40° C. to 80° C.

The separator of the present disclosure can also be produced by a dry coating method. The dry coating method is a method of applying a coating liquid to a porous substrate, drying the coating layer to remove a solvent by evaporation, and thereby forming an adhesive porous layer on the porous substrate. However, since the porous layer tends to be dense in the dry coating method as compared with the wet coating method, the wet coating method is more preferable from the viewpoint of obtaining a favorable porous structure.

The separator of the present disclosure can also be produced by a method of preparing an adhesive porous layer as an independent sheet, stacking the adhesive porous layer on a porous substrate, and forming a composite by thermal press bonding or an adhesive. Examples of the method of preparing an adhesive porous layer as an independent sheet include a method of forming an adhesive porous layer on a release sheet by applying the above-described wet coating method or dry coating method.

<Non-Aqueous Secondary Battery>

A non-aqueous secondary battery of the present disclosure is a non-aqueous secondary battery that obtains an electromotive force by doping/dedoping lithium, and includes a positive electrode, a negative electrode, and a separator for a non-aqueous secondary battery of the present disclosure. The doping means occlusion, support, adsorption, or insertion, and means a phenomenon that lithium ions enter an active material of an electrode such as a positive electrode.

The non-aqueous secondary battery of the present disclosure has a structure in which, for example, a battery element in which a negative electrode and a positive electrode face each other with a separator interposed therebetween is enclosed in an exterior material together with an electrolytic solution. The non-aqueous secondary battery of the present disclosure is suitable for a non-aqueous electrolyte secondary battery, particularly for a lithium ion secondary battery.

In the non-aqueous secondary battery of the present disclosure, since the separator of the present disclosure is excellent in adhesion to the electrode by the dry heat press, the production yield can be improved.

The active material layer of the electrode preferably contains a large amount of binder resin from the viewpoint of the adhesiveness to the separator, and preferably contains a large amount of active material and has a relatively small amount of binder resin from the viewpoint of increasing the energy density of the battery. Since the separator of the present disclosure is excellent in adhesion to the electrode, the amount of binder resin in the active material layer can be reduced to increase the amount of active material, and thus the energy density of the battery can be increased.

Hereinafter, aspect examples of the positive electrode, negative electrode, electrolyte solution, and exterior material included in the non-aqueous secondary battery according to the present disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer. Examples of the conductive auxiliary agent include carbon materials such as acetylene black, Ketjen black, and graphite powder. Examples of the current collector include an aluminum foil, a titanium foil, and a stainless steel foil, each having a thickness of from 5 μm to 20 μm.

In the non-aqueous secondary battery according to the present disclosure, since a polyvinylidene fluoride type resin, included in the adhesive porous layer of the separator according to the present disclosure, has excellent oxidation resistance, when the adhesive porous layer is disposed by contacting the positive electrode of the non-aqueous secondary battery, a positive electrode active material that can be operated at a high voltage of 4.2 V or more, such as $LiMn_{1/2}Ni_{1/2}O_2$ and $LiCo_{1/3}Mn_{1/3}Ni_{1/3}O_2$, can be easily applicable.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium. Specific examples thereof include carbon materials; and alloys of lithium in combination with silicon, tin, aluminum; wood's alloy, or the like. Examples of the binder resin include a polyvinylidene fluoride type resin and a styrene-butadiene copolymer. Examples of the conductive auxiliary agent include carbon materials such as acetylene black, Ketjen black, graphite powder and extra-fine carbon fiber. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the exterior material include a metal can and an aluminum laminated film pack. The shape of the battery may be a square shape, a cylindrical shape, a coin shape, and the like, but the separator of the present disclosure is suitable for any one of these shapes.

Examples of the method for producing a non-aqueous secondary battery of the present disclosure include a production method including a process of bonding a separator to an electrode by dry heat press, and a sealing process of sealing the electrode and the separator bonded to each other inside an exterior material together with an electrolytic solution.

More specifically, the above production method includes a laminating process of producing a laminated body in which the separator of the present disclosure is disposed between the positive electrode and the negative electrode, a dry adhesion process of performing the dry heat pressing on the laminated body to bond at least one of the positive electrode or the negative electrode to the separator, and a sealing process of sealing the laminated body subjected to the dry adhesion process inside the exterior material together with the electrolytic solution.

The laminating process is, for example, a process of disposing the separator of the present disclosure between the positive electrode and the negative electrode, a process of winding the separator in the length direction to produce a wound body, or a process of laminating the positive electrode, the separator, and the negative electrode by at least one layer in this order.

The dry adhering process may be carried out before the laminated body is stored in the outer packaging material (e.g. a pack made of an aluminum laminate film), or after the laminated body is stored in the outer packaging material. That is, the laminated body in which the electrode and the separator are adhered to each other by dry heat press may be stored in the outer packaging material, or the electrode and the separator may be adhered to each other by performing dry heat press from above the outer packaging material after storage of the laminated body in the outer packaging material.

The pressing temperature in the dry adhering process is preferably from 70° C. to 120° C., more preferably from 75° C. to 110° C., still more preferably from 80° C. to 100° C. When the pressing temperature is in the above-mentioned range, the electrode and the separator are favorably adhered to each other, and the separator can be moderately expanded in a transverse direction, so that a short-circuit of the battery hardly occurs. The press pressure in the dry adhering process is preferably from 0.5 kg to 40 kg in terms of a load per 1 cm$^2$ of the electrode. Preferably, the pressing time is adjusted according to the pressing temperature and the press pressure. For example, the pressing time is adjusted to fall within a range of 0.1 minutes to 60 minutes.

The laminated body may be temporarily adhered by subjecting the laminated body to room temperature press at normal temperature (pressurization at normal temperature) after the lamination process and prior to the dry adhering process.

The sealing process is a process of sealing an opening of the exterior material after injecting the electrolytic solution into the exterior material in which the laminated body is housed. The opening of the exterior material is sealed by, for example, bonding the opening of the exterior material with an adhesive or thermocompression-bonding the opening of the exterior material by heating and pressurization. It is preferable to bring the inside of the exterior body into a vacuum state before sealing the opening of the exterior material.

In the sealing process, it is preferable that the opening of the exterior material is thermocompression-bonded by heating and pressurization, and at the same time, the laminated body is heat-pressed from above the exterior material. By performing the hot pressing treatment (wet heat press) in a state where the laminated body and the electrolytic solution coexist, the adhesion between the electrode and the separator is further strengthened.

As the conditions of the wet heat press, the pressing temperature is preferably from 70° C. to 110° C., and the pressing pressure is preferably from 0.5 MPa to 2 MPa. The pressing time is preferably adjusted according to the pressing temperature and the pressing pressure, and is adjusted, for example, in a range of 0.5 minutes to 60 minutes.

EXAMPLES

Hereinafter, the separator and the non-aqueous secondary battery of the present disclosure will be described more specifically with reference to Examples. Materials, used amounts, ratios, treatment procedures, and the like illustrated in the following Examples can be changed, if appropriate without departing from the spirit of the present disclosure. Therefore, the range of the separator and the non-aqueous secondary battery of the present disclosure should not be construed as being limited by the specific examples described below.

<Measurement Method and Evaluation Method>

The measurement methods and evaluation methods applied in the examples of the invention and comparative examples are as follows.

[Composition of Polyvinylidene Fluoride Type Resin]

20 mg of polyvinylidene fluoride type resin was dissolved in 0.6 ml of heavy dimethyl sulfoxide at 100° C., a $^{19}$F-NMR spectrum was measured at 100° C., and the composition of the polyvinylidene fluoride type resin thus obtained was determined from the NMR spectrum.

[Weight-Average Molecular Weight of Resin]

The weight-average molecular weight (Mw) of the resin was measured by gel permeation chromatography (GPC). The molecular weight was measured by GPC using a GPC device "GPC-900" manufactured by JASCO Corporation, using two columns of TSKgel SUPER AWM-H manufactured by Tosoh Corporation, using N, N-dimethylformamide for a solvent, under conditions that temperature was 40° C. and a flow rate was 10 mL/min to obtain a molecular weight in terms of polystyrene.

[Glass Transition Temperature of Acrylic Type Resin]

The glass transition temperature of the acrylic type resin was determined from a differential scanning calorimetry curve (DSC curve) obtained by performing differential scanning calorimetry (DSC). The glass transition temperature is a temperature at a point where a straight line obtained by extending a base line on the low temperature side to the high temperature side crosses a tangent line of a curve at a step-like change part, which has the largest gradient.

[Average Primary Particle Diameter of Inorganic Particle]

The inorganic particles before being added to the coating liquid for forming the adhesive porous layer were used as samples.

The average primary particle diameter of the magnesium hydroxide particles was determined by measuring the major diameters of 100 magnesium hydroxide particles randomly selected in observation with a scanning electron microscope (SEM), and averaging the major diameters of 100 magnesium hydroxide particles. The magnification of the SEM was set to from 50,000 times to 300,000 times.

Since it was difficult to measure the major diameters of the primary particles of the prepared barium sulfate particles by the SEM, the specific gravity (g/cm$^3$) and the BET specific surface area (m$^2$/g) of the barium sulfate particles were measured, and the average primary particle diameter of the barium sulfate particles was determined according to the following formula assuming that the barium sulfate particles were spherical. As an apparatus for measuring the BET specific surface area, ASAP 2020 manufactured by Micromeritics was used.

$$\text{Average primary particle diameter (μm)}=6 \div [\text{specific gravity (g/cm}^3\text{)} \times \text{BET specific surface area (m}^2/\text{g)}]$$

[Thicknesses of Porous Substrate and Separator]

Each of the thicknesses (μm) of the porous substrate and the separator was determined by measuring thicknesses at 20 points with a contact-type thickness gauge (Mitutoyo Corporation, LITEMATIC VL-50) and averaging the measured values. As a measuring terminal, a cylindrical terminal having a diameter of 5 mm was used, and adjustment was performed such that a load of 0.01 N was applied during the measurement.

[Thickness of Adhesive Porous Layer]

The thickness of the adhesive porous layer (μm) was determined by subtracting the thickness of the porous substrate (μm) from the thickness of the separator (μm) to obtain the total thickness of the both side layers, and the half value thereof was determined as the thickness of one side (μm).

[Gurley Value]

The Gurley value (sec/100 ml) of each of the porous substrate and the separator was measured with a Gurley type densometer (G-B2C manufactured by Toyo Seiki Seisakusho, Ltd.) in accordance with JIS P8117 (2009).

[Porosity of Porous Substrate]

The porosity ε (%) of the porous substrate was determined by the following formula.

$$\varepsilon = \{1 - Ws/(ds \cdot t)\} \times 100$$

Ws: basis weight of porous substrate (g/m$^2$), ds: true density of porous substrate (g/cm$^3$), t: thickness of porous substrate (μm).

[Porosity of Adhesive Porous Layer]

The porosity ε (%) of the adhesive porous layer was determined by the following formula.

$$\varepsilon = \{1 - (Wa/da + Wb/db + Wc/dc + \ldots + Wn/dn)/t\} \times 100$$

Here, the constituent materials of the adhesive porous layer are represented by a, b, c, . . . , n, the mass of each constituent material is represented by Wa, Wb, Wc, . . . , or Wn (g/cm$^2$), the true density of each constituent material is represented by da, db, dc, . . . , or dn (g/cm$^3$), and the thickness of the heat-resistant porous layer is represented by t (cm).

[Peel Strength Between Porous Substrate and Adhesive Porous Layer]

A T-shaped peel test was performed on the separator. Specifically, a pressure-sensitive adhesive tape (Manufactured by 3M Company, width: 12 mm) was attached to one side of the separator (when the pressure-sensitive adhesive tape was attached, the length direction of the pressure-sensitive adhesive tape was matched with the MD direction of the separator.), and the separator was cut out together with the pressure-sensitive adhesive tape into a size of 12 mm in a TD direction and 70 mm in an MD direction. The pressure-sensitive adhesive tape was slightly peeled off together with the adhesive porous layer immediately below. Two separated ends were held by Tensilon (Orientec Co., Ltd., RTC-1210A), and a T-peel test was performed. Note that the pressure-sensitive adhesive tape was used as a support for peeling off the adhesive porous layer from the porous substrate. The tensile speed of the T-peel test was 20 mm/min. A load (N) from 10 mm to 40 mm after start of measurement was sampled at 0.4 mm intervals. An average thereof was calculated and converted into a load per 10 mm width (N/10 mm). Furthermore, the loads of three test pieces (N/10 mm) were averaged.

[Amount of Generation of Gas]

The separator was cut into a size of 600 cm$^2$ and put in an aluminum laminated film pack. An electrolytic solution was injected into the pack to impregnate the separator with the electrolytic solution, and the pack was sealed to obtain a test cell. As the electrolytic solution, 1 mol/L LiPF$_6$-ethylene carbonate:ethyl methyl carbonate (mass ratio 3:7) was used. The test cell was placed in an environment at a temperature of 85° C. for 20 days, and the volume of the test cell was measured before and after the heat treatment. The amount of generation of gas V (=V2−V1, unit: mL) was determined by subtracting the volume V1 of the test cell before the heat treatment from the volume V2 of the test cell after the heat treatment. Furthermore, the amounts of generation of gas V of the ten test cells were averaged.

[Spot Heating]

The separator was cut out into a size of 50 mm in an MD direction×50 mm in a TD direction to prepare a test piece. The test piece was placed on a horizontal table. A soldering iron having a tip diameter of 2 mm was heated such that the temperature of the tip was 260° C. In this state, the tip of the soldering iron was brought into point contact with a side of the separator for 60 seconds. The area (mm$^2$) of holes formed in the separator by point contact was measured, and the areas of holes of the ten test pieces were averaged. The higher the heat resistance of the separator is, the smaller the area of holes formed in the separator is.

[Area Shrinkage Ratio by Heat Treatment]

The separator was cut out into a size of 180 mm in an MD direction×60 mm in a TD direction to prepare a test piece. This test piece was marked at points of 20 mm and 170 mm from one end on a line bisecting the test piece in a TD direction (referred to as points A and B, respectively). Furthermore, the test piece was marked at points of 10 mm and 50 mm from one end on a line bisecting the test piece in an MD direction (referred to as points C and D, respectively). A clip was attached to the test piece (a point where the clip was attached was between the point A and an end closest to the point A). The test piece was hung in an oven in which the temperature was adjusted to 135° C., or 150° C. to be heated under no tension for one hour. A length between A and B and a length between C and D were measured before and after the heat treatment, and an area shrinkage ratio was calculated by the following formula. Furthermore, the area shrinkage ratios of the three test pieces were averaged.

Area shrinkage ratio (%)={1−(length between $A$ and $B$ after heat treatment÷length between $A$ and $B$ before heat treatment)×(length between $C$ and $D$ after heat treatment÷length between $C$ and $D$ before heat treatment)}×100

[Adhesive Strength to Positive Electrode During Dry Heat Press]

89.5 g of lithium cobaltate powder as a positive electrode active material, 4.5 g of acetylene black as a conduction aid, and 6 g of polyvinylidene fluoride as a binder were dissolved or dispersed in N-methylpyrrolidone so that the concentration of polyvinylidene fluoride was 6% by mass, and stirred with a double arm mixer to prepare a positive electrode slurry. The positive electrode slurry was applied to one side of an aluminum foil having a thickness of 20 μm, dried, and then pressed to obtain a positive electrode having a positive electrode active material layer.

The positive electrode obtained above was cut into a width of 15 mm and a length of 70 mm, and the separator was cut into a rectangle of 18 mm in a TD direction×75 mm in an MD direction. The positive electrode and the separator were stacked, and hot pressed under the conditions of a temperature of 80° C., a pressure of 5.0 MPa, and a time of 3 minutes to bond the positive electrode and the separator, which was used as a test piece. The separator was slightly peeled off from the positive electrode at one end in the length direction of the test piece (that is, the MD direction of the separator), and the two separated end portions were held by Tensilon (RTC-1210A manufactured by ORIENTEC Corporation) to perform a T-shape peeling test. The tensile speed of the T-shaped peeling test was set to 20 mm/min, and a load (N) from 10 mm to 40 mm after the start of the measurement was taken at intervals of 0.4 mm, the average thereof was calculated, and the measured values of the three test pieces were further averaged to obtain an adhesive strength (N) between the separator and the positive electrode. In Table 1, the adhesive strength of Comparative Example 1 is set to a reference value of 100, and the adhesive strength of each of Examples and Comparative Examples is shown in percentage.

[Adhesive Strength to Negative Electrode During Dry Heat Press]

300 g of artificial graphite as a negative electrode active material, 7.5 g of a water-soluble dispersion containing 40% by mass of a modified product of a styrene-butadiene copolymer as a binder, 3 g of carboxymethyl cellulose as a thickener, and an appropriate amount of water were stirred and mixed by a double arm mixer to prepare a negative electrode slurry. The negative electrode slurry was applied to one side of a copper foil having a thickness of 10 μm, dried, and then pressed to obtain a negative electrode having a negative electrode active material layer.

Using the negative electrode obtained above, a T-shaped peeling test was performed in the same manner as the method for measuring the adhesive strength with the positive electrode, and the adhesive strength (N) between the separator and the negative electrode was determined. In Table 1, the adhesive strength of Comparative Example 1 is set to a reference value of 100, and the adhesive strength of each of Examples and Comparative Examples is shown in percentage.

[Cycle Characteristics (Capacity Retention Ratio) of Battery]

A lead tab was welded to the positive electrode and negative electrode, and the positive electrode, the separator, and the negative electrode were laminated in this order. The resulting laminated body was inserted into a pack made of an aluminum laminate film, the inside of the pack was brought into vacuum state and temporarily sealed using a vacuum sealer, and the pack was hot-pressed in the lamination direction of the laminated body using a hot-pressing machine, thereby adhering the electrodes and the separator to each other. As conditions for hot-pressing, the temperature was 90° C., the load per 1 cm$^2$ of electrode was 20 kg, and the pressing time was 2 minutes. Then, an electrolytic solution (1 mol/L LiPF$_6$-ethylene carbonate:ethylmethyl carbonate [mass ratio 3:7]) was injected into the pack, the laminated body was impregnated with the electrolytic solution, and the inside of the pack was brought into a vacuum state and sealed using a vacuum sealer, thereby obtaining a test secondary battery.

The test secondary battery was charged and discharged for 500 cycles under the environment at a temperature of 40° C. Charging was performed by constant current constant voltage charge of 1 C and 4.2 V, and discharging was performed by constant current discharge of 1 C and 2.75 V cutoff. The discharge capacity at the 500th cycle was divided by the initial discharge capacity to calculate the average of 10 batteries, and the obtained value (%) was taken as the capacity retention ratio.

[Load Characteristics of Battery]

A test secondary battery was produced in the same manner as in the battery production in [Cycle Characteristics (Capacity Retention Ratio) of Battery]. The battery was charged and discharged in the environment at a temperature of 15° C., the discharge capacity when discharged at 0.2C and the discharge capacity when discharged at 2C were measured, the latter was divided by the former, the average of 10 batteries was calculated, and the obtained value (%) was taken as the load characteristics. Charging was performed by constant current and constant voltage charge at 0.2 C and 4.2 V for 8 hours, and discharging was performed by constant current discharge with a cutoff of 2.75 V.

<Production of Separator>

Example 1

A polyvinylidene fluoride type resin (VDF-HFP copolymer, HFP unit content: 12.4% by mass, weight-average molecular weight: 860,000) and an acrylic type resin (methyl methacrylate-styrene copolymer, polymerization ratio [mass ratio] 50:50, weight-average molecular weight 115,000, and glass transition temperature 105° C.) were dissolved in a mixed solvent of dimethylacetamide (DMAc) and tripropylene glycol (TPG) (DMAc:TPG=80:20 [mass ratio]), and barium sulfate particles (average primary particle diameter: 0.06 μm) were further dispersed to obtain a coating liquid 1. The coating liquid 1 had a mass ratio of a polyvinylidene fluoride type resin to an acrylic type resin (polyvinylidene fluoride type resin:acrylic type resin) of 80:20, a resin concentration of 5.0% by mass, and a mass ratio of the resin to an inorganic filler (resin:inorganic filler) of 20:80.

The coating liquid 1 was applied to both sides of a polyethylene microporous film (thickness 9.0 μm, Gurley value 150 seconds/100 mL, and porosity 43%) (in this case, coating was performed so that the coating amounts on the front and back surfaces were equal.). This was immersed in a coagulation liquid (water:DMAc:TPG=62.5:30:7.5 [mass ratio], liquid temperature 35° C.) to solidify the coating layer, then washed with water, and dried. In this way, a separator in which an adhesive porous layer was formed on both sides of a polyethylene microporous film was obtained.

Example 2

A separator was prepared in the same manner as in Example 1 except that the acrylic type resin was changed to another acrylic type resin (methyl methacrylate-butyl acrylate-styrene copolymer, polymerization ratio [mass ratio] 40:20:40, weight-average molecular weight 144,000, and glass transition temperature 64° C.).

Example 3

A separator was prepared in the same manner as in Example 1 except that the acrylic type resin was changed to another acrylic type resin (methyl methacrylate-butyl acrylate-styrene copolymer, polymerization ratio [mass ratio] 30:20:50, weight-average molecular weight 156,000, and glass transition temperature 67° C.), and the barium sulfate particles were changed to other barium sulfate particles (average primary particle diameter: 0.07 μm).

Example 4

A separator was prepared in the same manner as in Example 3 except that the acrylic type resin was changed to another acrylic type resin (2-hydroxyethyl methacrylate-butyl acrylate-styrene copolymer, polymerization ratio [mass ratio] 10:18:72, weight-average molecular weight 115,000, and glass transition temperature 71° C.).

Example 5

A separator was prepared in the same manner as in Example 3 except that the acrylic type resin was changed to another acrylic type resin (methyl methacrylate-styrene-maleic anhydride ternary copolymer, polymerization ratio [mass ratio] 30:50:20, weight-average molecular weight 130,000, and glass transition temperature 115° C.).

Example 6

A separator was prepared in the same manner as in Example 1 except that the acrylic type resin was changed to another acrylic type resin (methyl methacrylate-butyl acrylate-styrene-maleic anhydride quaternary copolymer, polymerization ratio [mass ratio] 35:20:40:5, weight-average molecular weight 144,000, and glass transition temperature 64° C.).

Example 7

A separator was prepared in the same manner as in Example 1 except that barium sulfate particles were changed to other barium sulfate particles (average primary particle diameter: 0.28 μm).

Comparative Example 1

A separator was prepared in the same manner as in Example 1 except that the acrylic type resin was not used, the amount of the polyvinylidene fluoride type resin was increased accordingly, and barium sulfate particles were not used.

Comparative Example 2

A separator was prepared in the same manner as in Example 1 except that the acrylic type resin was not used, and the amount of the polyvinylidene fluoride type resin was increased accordingly.

Comparative Example 3

A separator was prepared in the same manner as in Example 3 except that barium sulfate particles were changed to other barium sulfate particles (average primary particle diameter: 0.35 μm).

Comparative Example 4

A separator was prepared in the same manner as in Example 3 except that the barium sulfate particles were changed to magnesium hydroxide particles (average primary particle diameter: 0.8 μm).

The composition, physical properties, and evaluation results of each separator of Examples 1 to 7 and Comparative Examples 1 to 4 are shown in Table 1

TABLE 1

| | | | | Example 1 | Example 2 | Example 3 | Example 4 | Example 5 | Example 6 |
|---|---|---|---|---|---|---|---|---|---|
| Adhesive porous layer | Binder | PVDF type resin | % by mass | 80 | 80 | 80 | 80 | 80 | 80 |
| | | Acrylic type resin | % by mass | 20 | 20 | 20 | 20 | 20 | 20 |
| | PVDF type resin | HFP | % by mass | 12.4 | 12.4 | 12.4 | 12.4 | 12.4 | 12.4 |
| | | Mw | — | 860,000 | 860,000 | 860,000 | 860,000 | 860,000 | 860,000 |
| | Acrylic type resin | Methyl methacrylate | % by mass | 50 | 40 | 30 | 0 | 30 | 35 |
| | | Butyl acrylate | % by mass | 0 | 20 | 20 | 18 | 0 | 20 |
| | | 2-Hydroxyethyl methacrylate | % by mass | 0 | 0 | 0 | 10 | 0 | 0 |
| | | Styrene | % by mass | 50 | 40 | 50 | 72 | 50 | 40 |
| | | Maleic anhydride | % by mass | 0 | 0 | 0 | 0 | 20 | 5 |
| | | Mw | — | 115,000 | 144,000 | 156,000 | 115,000 | 130,000 | 144,000 |
| | | Tg | °C. | 105 | 64 | 67 | 71 | 115 | 64 |
| | Inorganic filler | Kind | | BaSO$_4$ | BaSO$_4$ | BaSO$_4$ | BaSO$_4$ | BaSO$_4$ | BaSO$_4$ |
| | Average primary particle diameter of inorganic filler | | μm | 0.06 | 0.06 | 0.07 | 0.07 | 0.07 | 0.06 |
| | Layer thickness (one side) | | μm | 2 | 2 | 2 | 2 | 2 | 2 |
| | Porosity | | % | 58 | 59 | 60 | 59 | 60 | 61 |
| | Peel strength with porous substrate | | N/10 mm | 0.28 | 0.29 | 0.29 | 0.27 | 0.28 | 0.31 |
| Separator | Thickness | | μm | 13 | 13 | 13 | 13 | 13 | 13 |
| | Gurley value | | Sec/100 mL | 207 | 206 | 203 | 205 | 205 | 202 |
| | Gas generation amount | | mL | 0 | 0 | 0 | 0 | 0 | 0 |
| | Spot heating | | mm$^2$ | 5 | 6 | 6 | 6 | 5 | 6 |
| | Area shrinkage ratio | 135° C. | % | 7 | 7 | 8 | 8 | 7 | 7 |
| | | 150° C. | % | 9 | 8 | 9 | 9 | 9 | 8 |
| | Adhesive strength with electrode | Positive electrode | % | 101 | 111 | 112 | 114 | 110 | 115 |
| | | Negative electrode | % | 103 | 118 | 115 | 120 | 115 | 120 |
| Battery | Cycle characteristic (capacity retention ratio) | | % | 96 | 96 | 96 | 95 | 95 | 96 |
| | Load characteristic | | % | 94 | 94 | 94 | 94 | 94 | 94 |

TABLE 1-continued

| | | | | Example 7 | Comparative Example 1 | Comparative Example 2 | Comparative Example 3 | Comparative Example 4 |
|---|---|---|---|---|---|---|---|---|
| Adhesive porous layer | Binder | PVDF type resin | % by mass | 80 | 100 | 100 | 80 | 80 |
| | | Acrylic type resin | % by mass | 20 | 0 | 0 | 20 | 20 |
| | PVDF type resin | HFP | % by mass | 12.4 | 12.4 | 12.4 | 12.4 | 12.4 |
| | | Mw | — | 860,000 | 860,000 | 860,000 | 860,000 | 860,000 |
| | Acrylic type resin | Methyl methacrylate | % by mass | 50 | — | — | 30 | 30 |
| | | Butyl acrylate | % by mass | 0 | | | 20 | 20 |
| | | 2-Hydroxyethyl methacrylate | % by mass | 0 | | | 0 | 0 |
| | | Styrene | % by mass | 50 | | | 50 | 50 |
| | | Maleic anhydride | % by mass | 0 | | | 0 | 0 |
| | | Mw | — | 115,000 | | | 156,000 | 156,000 |
| | | Tg | °C. | 105 | | | 67 | 67 |
| | Inorganic filler | Kind | | $BaSO_4$ | — | $BaSO_4$ | $BaSO_4$ | $Mg(OH)_2$ |
| | | Average primary particle diameter of inorganic filler | μm | 0.28 | | 0.06 | 0.35 | 0.8 |
| | | Layer thickness (one side) | μm | 2 | 1.5 | 2 | 2 | 2 |
| | | Porosity | % | 62 | 52 | 57 | 60 | 58 |
| | | Peel strength with porous substrate | N/10 mm | 0.33 | 0.25 | 0.09 | 0.12 | 0.32 |
| Separator | | Thickness | μm | 13 | 12 | 13 | 13 | 13 |
| | | Gurley value | Sec/100 mL | 200 | 208 | 217 | 216 | 203 |
| | | Gas generation amount | mL | 0 | 0 | 0 | 0 | 1 |
| | | Spot heating | mm² | 7 | 10 | 5 | 8 | 9 |
| | Area shrinkage ratio | 135° C. | % | 12 | 38 | 7 | 31 | 35 |
| | | 150° C. | % | 19 | 82 | 9 | 72 | 78 |
| | Adhesive strength with electrode | Positive electrode | % | 116 | 100 | 10 | 53 | 105 |
| | | Negative electrode | % | 113 | 100 | 7 | 42 | 101 |
| Battery | Cycle characteristic (capacity retention ratio) | | % | 96 | 80 | 94 | 94 | 89 |
| | Load characteristic | | % | 94 | 80 | 92 | 93 | 87 |

The disclosure of Japanese Patent Application No. 2019-050778 filed on Mar. 19, 2019 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:
   a porous substrate; and
   an adhesive porous layer that is provided on one side or on both sides of the porous substrate, and that contains a polyvinylidene fluoride type resin, an acrylic type resin and metal sulfate particles,
   wherein an average primary particle diameter of the metal sulfate particles contained in the adhesive porous layer is from 0.01 μm to less than 0.30 μm, and
   wherein a content of the acrylic type resin contained in the adhesive porous layer with respect to a total amount of all resins contained in the adhesive porous layer is from 7% by mass to 40% by mass.

2. The separator for a non-aqueous secondary battery according to claim 1, wherein the acrylic type resin includes an acrylic type resin containing an acrylic type monomer unit, a styrene type monomer unit and an unsaturated carboxylic acid anhydride unit.

3. The separator for a non-aqueous secondary battery according to claim 1, wherein the acrylic type resin includes an acrylic type resin containing at least one of a methyl acrylate unit or a methyl methacrylate unit, and a total content of the methyl acrylate unit and the methyl methacrylate unit in the acrylic type resin is 20% by mass to 60% by mass.

4. The separator for a non-aqueous secondary battery according to claim 1, wherein the polyvinylidene fluoride type resin contains a hexafluoropropylene monomer unit, a content of the hexafluoropropylene monomer unit in the polyvinylidene fluoride type resin is 3% by mass to 20% by mass, and a weight-average molecular weight of the polyvinylidene fluoride type resin is from 100,000 to 1,500,000.

5. A non-aqueous secondary battery that obtains electromotive force by lithium doping and dedoping, the non-aqueous secondary battery containing:
   a positive electrode;
   a negative electrode; and
   the separator for a non-aqueous secondary battery according to claim 1, the separator being disposed between the positive electrode and the negative electrode.

6. The separator for a non-aqueous secondary battery according to claim 1, wherein the acrylic type resin is a styrene acrylic type resin.

7. The separator for a non-aqueous secondary battery according to claim 1, wherein a glass transition temperature (Tg) of the acrylic type resin is from −20° C. to 71° C.

8. The separator for a non-aqueous secondary battery according to claim 1, wherein the average primary particle diameter of the metal sulfate particles contained in the adhesive porous layer is from 0.01 μm to less than 0.07 μm.

* * * * *